(12) United States Patent
Montgomery

(10) Patent No.: US 6,930,406 B2
(45) Date of Patent: Aug. 16, 2005

(54) TIDE COMPENSATED SWELL POWERED GENERATOR

(75) Inventor: W. C. Gray Montgomery, 1627 Camellia St., Vidalia, LA (US) 71373

(73) Assignee: W. C. Gray Montgomery, Vidalia, LA (US)

( * ) Notice: Subject to any disclaimer, the term of this patent is extended or adjusted under 35 U.S.C. 154(b) by 130 days.

(21) Appl. No.: 10/370,223

(22) Filed: Feb. 19, 2003

(65) Prior Publication Data

US 2004/0160060 A1 Aug. 19, 2004

(51) Int. Cl.$^7$ .......................... F03B 13/10; F03B 13/12; F03B 13/00; H02P 9/04
(52) U.S. Cl. .............................. 290/42; 290/43; 290/53; 290/54
(58) Field of Search ............................. 240/43, 42, 53, 240/54; 60/495, 497; 415/916; 417/331, 334

(56) References Cited

U.S. PATENT DOCUMENTS

| | | | |
|---|---|---|---|
| 2,907,304 A | * 10/1959 | Elmer | 91/6 |
| 3,487,228 A | * 12/1969 | Kriegel | 290/52 |
| 3,515,889 A | 6/1970 | Kammerer | |
| 4,076,463 A | * 2/1978 | Welczer | 417/331 |
| 4,104,006 A | * 8/1978 | Meiri | 417/334 |
| 4,208,878 A | * 6/1980 | Rainey | 60/496 |
| 4,398,095 A | * 8/1983 | Ono | 290/53 |
| 4,421,461 A | * 12/1983 | Hicks et al. | 417/53 |
| 4,425,510 A | * 1/1984 | Jury | 290/42 |
| 4,455,824 A | 6/1984 | Dabringhaus | |
| 4,598,211 A | * 7/1986 | Koruthu | 290/53 |
| 4,739,182 A | * 4/1988 | Kenderi | 290/54 |
| 4,754,157 A | * 6/1988 | Windle | 290/53 |
| 4,883,411 A | * 11/1989 | Windle | 417/331 |
| 5,473,892 A | * 12/1995 | Margittai | 60/398 |
| 5,986,349 A | 11/1999 | Eberle | |
| 6,020,653 A | * 2/2000 | Woodbridge et al. | 290/53 |
| 6,140,712 A | 10/2000 | Fredriksson et al. | |
| 6,229,225 B1 | * 5/2001 | Carroll | 290/53 |
| 6,768,216 B1 | * 7/2004 | Carroll et al. | 290/42 |
| 6,800,954 B1 | * 10/2004 | Meano | 290/53 |

FOREIGN PATENT DOCUMENTS

| RU | 2016224 | 7/1994 |
|---|---|---|
| WO | WO 84/02162 | 6/1984 |

OTHER PUBLICATIONS

CNN.com, "Harnessing Sea Power: Energy Wave of the Future?" Jun. 8, 2001.
San Francisco Chronicle, "Oceans of Energy Await Harnessing: Berkeley Startup Seeks Funding for Plant to Replace Diesel Engines with Wave Power." Jun. 17, 2001.

* cited by examiner

*Primary Examiner*—Darren Schuberg
*Assistant Examiner*—Julio C. Gonzalez

(57) ABSTRACT

The invention comprises a float system having a float connected to a pump line and a reservoir tank. As the float rises and falls with the passing swells, it forces water through the pump line into a reservoir tank. An outflow line connects the reservoir line to a generator system, preferably located on shore, where the flowing water is used to drive a turbine and generate electricity. Preferably, there are a plurality of reservoir tanks, each with its own float and pump line, delivering water to the generator system. The flow of water through the pump line is kept steady by providing each reservoir tank with a pressurized air cushion which provides for constant outflow of water from each tank despite variances in the inflow.

37 Claims, 13 Drawing Sheets

FIGURE 1 Replacement Sheet

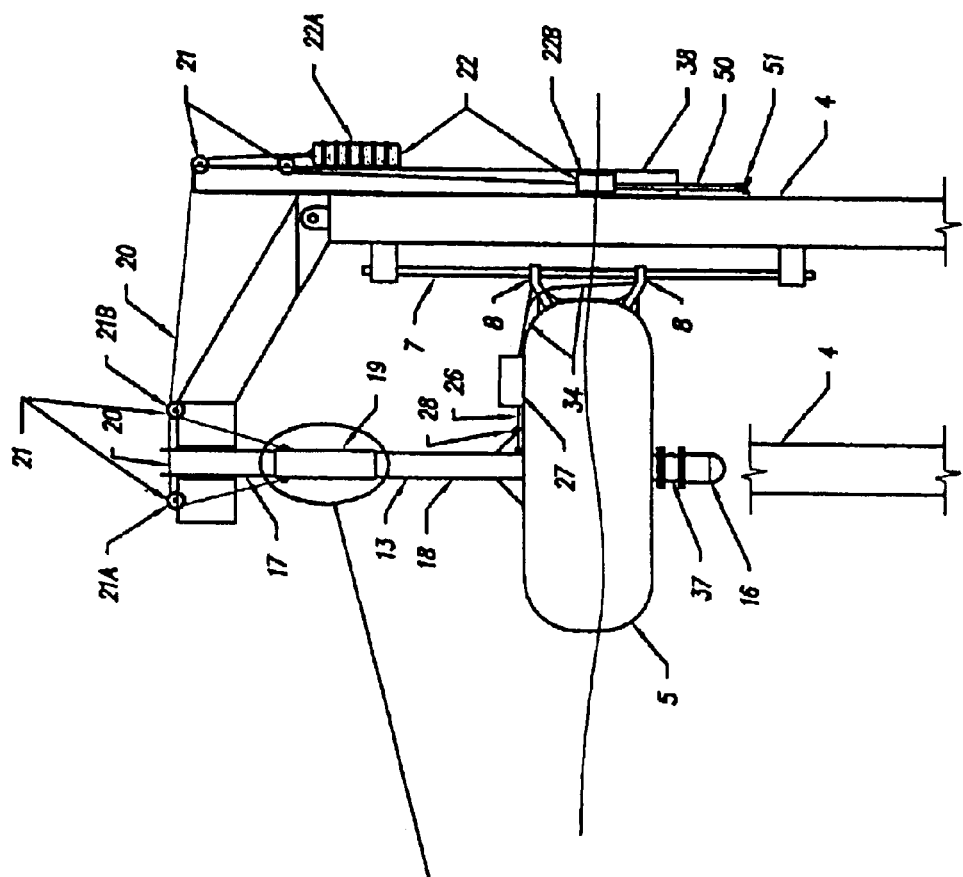
FIGURE 7
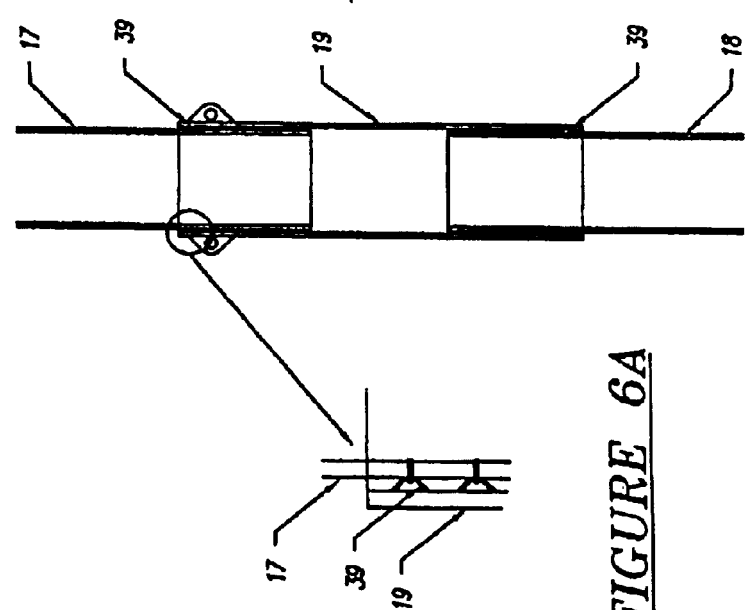
FIGURE 6
FIGURE 6A

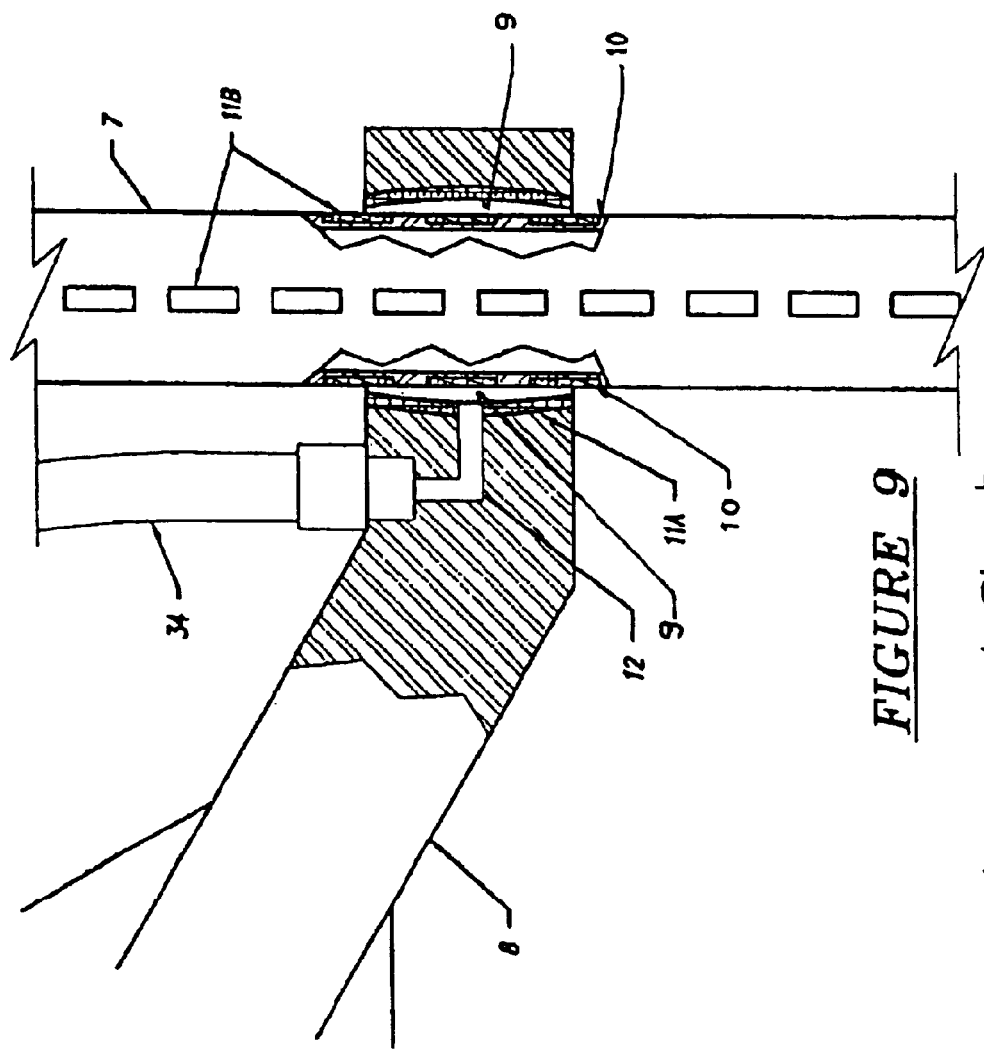
FIGURE 9
Replacement Sheet

TIDE COMPENSATED SWELL POWERED GENERATOR

FIELD OF THE INVENTION

The invention relates to swell driven generators in general and to pump type swell powered generators in particular.

PRIOR ART

There have been many attempts to harness the mechanical power of the ocean to create electricity. Examples include generators that harness the inflow and outflow of water into constricted inlets at the shore. Turbines are placed in the constricted inlet, and the force of the water moving through it drives the turbines to generate electricity. Such systems typically require the existence of a natural constricted inlet, and thus are only applicable to only a limited coastal environment. Additionally, such systems depend upon tidal movement for water flow to drive the turbines. The amount of water displaced by tidal movement will vary with lunar phase, which will affect the total amount of electricity such systems can generate. Likewise, the time of maximum tidal movement will change from day to day depending upon the lunar phase, among other factors. This will cause the turbines to generate maximum amounts of electricity at different times each day, making it difficult to coordinate electrical output with demand.

Other prior art systems harness the motion of the waves or swells to drive generators. These systems generally fall into three categories. There are direct drive systems in which a float is directly connected to a generator, such as by a rod and a cam shaft. As the float rises and falls with the passing swells, the rod turns the shaft which in turn drives a generator, producing electricity. These systems have the advantage of minimizing the number of steps between the mechanical wave action and the conversion to electricity. However, they typically generate electricity where the swell is located, usually in the open ocean, beyond the breaker line. If the electricity is not to be used there, lines must be laid to carry the electricity inland, which can lead to a loss of efficiency.

Another type of prior art swell driven system is a vacuum generator. In this type of system, a float is connected to an airway. The float will constitute a moveable seal at one end of the airway. For air to pass into or out of the airway, it must pass through a turbine. As the float falls with a falling swell, it will pull air through the turbine, causing it to turn. Similarly, as the float rises with a rising swell, it will push air through the turbine, again causing the turbine to turn. The turbine will of course be connected to a generator which will produce electricity.

Still another type of prior art swell driven system utilizes a water powered generator. In this type of system, a float is connected to a water line. As the float falls, it will create a vacuum, drawing water into the line. As the float rises with the next swell, the float will push the water up the line. This water pressure can be used to turn a turbine, and generate electricity.

One problem that arises with any swell driven system is that the range of motion of the float riding on the swells will vary with the size of the swells and with the level of the sea in view of the tide. The system on which the float rides must be able to accommodate such changes in the range of motion. Another problem that such systems face is friction opposing the rise and fall of the float. This friction will reduce the motion of the float and ultimately reduce the electric output of the system.

When swell driven floats are used to pump water, they only pump water on the upstroke of the float—that is while the float is rising with the swell. This can cause the flow of water to the turbine to be intermittent. However, it is desirable that the flow of water to a turbine be constant. Therefore, a swell driven generator system meeting the following objectives is desired.

OBJECTS OF THE INVENTION

It is an object of the invention to produce electricity from the rise and fall of ocean swells.

It is another object of the invention to produce electricity using a float that rises and falls with the ocean swells.

It is another object of the invention to minimize the friction opposing the rise and fall of the float.

It is another object of the invention to accommodate variations in the range of motion of the float as the level of the ocean changes with the tide and as the size of the swells change.

It is another object of the invention to pump water for the operation of an electric generator.

It is still another object of the invention to regulate the flow of water to the electric generator so that the water flow is substantially continuous.

It is yet another object of the invention to use the energy in ocean swells to provide water to drive a land based electric generator.

SUMMARY OF THE INVENTION

The invention comprises a float system having a float connected to a pump line and a reservoir tank. The float system is preferably located in the open ocean at least about 1500 feet from the shore, so as to be out past the surf. The float will rise and fall with the passing swells, forcing water through the pump line into a reservoir tank. An outflow line connects the reservoir line to a generator system, preferably located on shore, where the flowing water is used to drive a turbine and generate electricity. Preferably, there are a plurality of reservoir tanks, each with their own float and pump line, delivering water to the generator system. The flow of water through the pump line is kept steady by providing each reservoir tank with a pressurized air cushion which provides for constant outflow of water from each tank despite variances in the inflow.

Each float also rises and falls along a guide rod. The friction inherent in the rise and fall of each float is minimized by positioning two columns of opposing magnets, one on the guide rod and the other on the part of the float mounted to the guide rods. The force of the magnets opposing each other will minimize the contact between the float and the guide rod, thereby minimizing the friction. Friction is also reduced by providing a plurality of nozzles which are configured to spray water between the float and the guide rod.

BRIEF DESCRIPTION OF THE FIGURES

FIG. 6 is a cut-away side view of a pump line having three sections.

FIG. 6A is cut-away detail view of the seals between the sections of the pump line.

FIG. 7 is a side and partial cut-away view of a float, a float frame, sleeve, and counter weight.

FIG. 9 is a side cut-away view of a guide arm, guide rod, nozzle, and magnets.

DETAILED DESCRIPTION OF THE PREFERRED EMBODIMENT OF THE INVENTION

Figure 1:
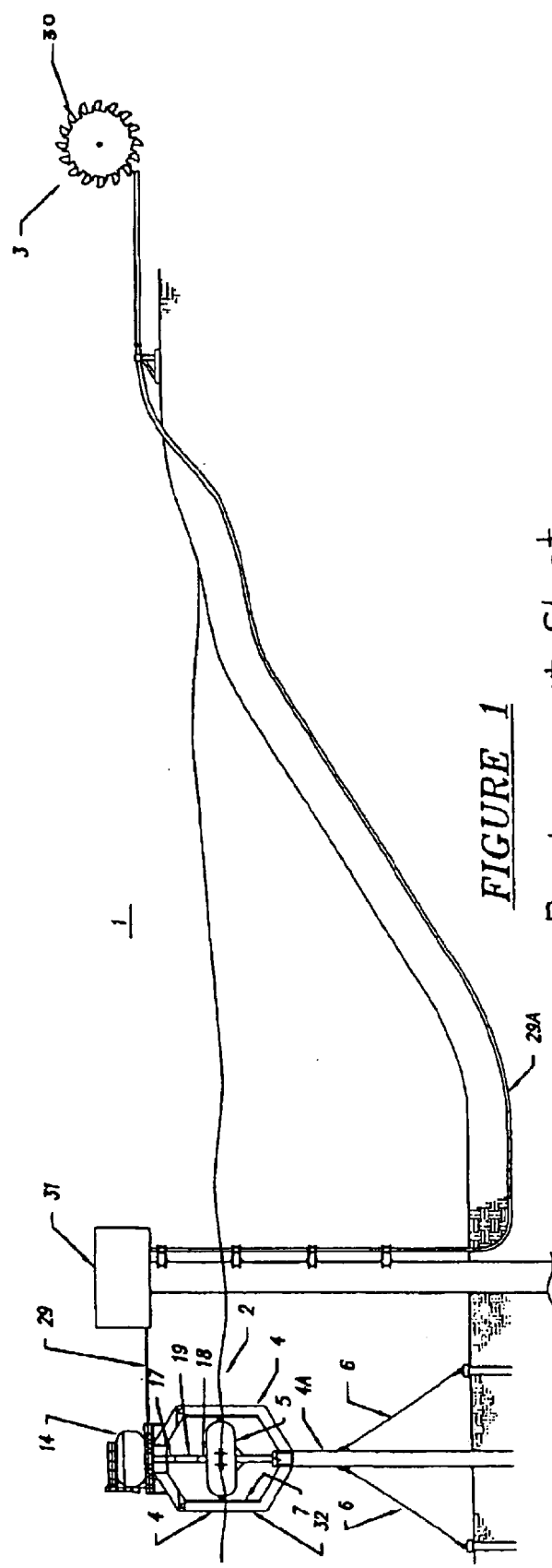
FIG. 1 is schematic view of a power generator system.
Figure 2:
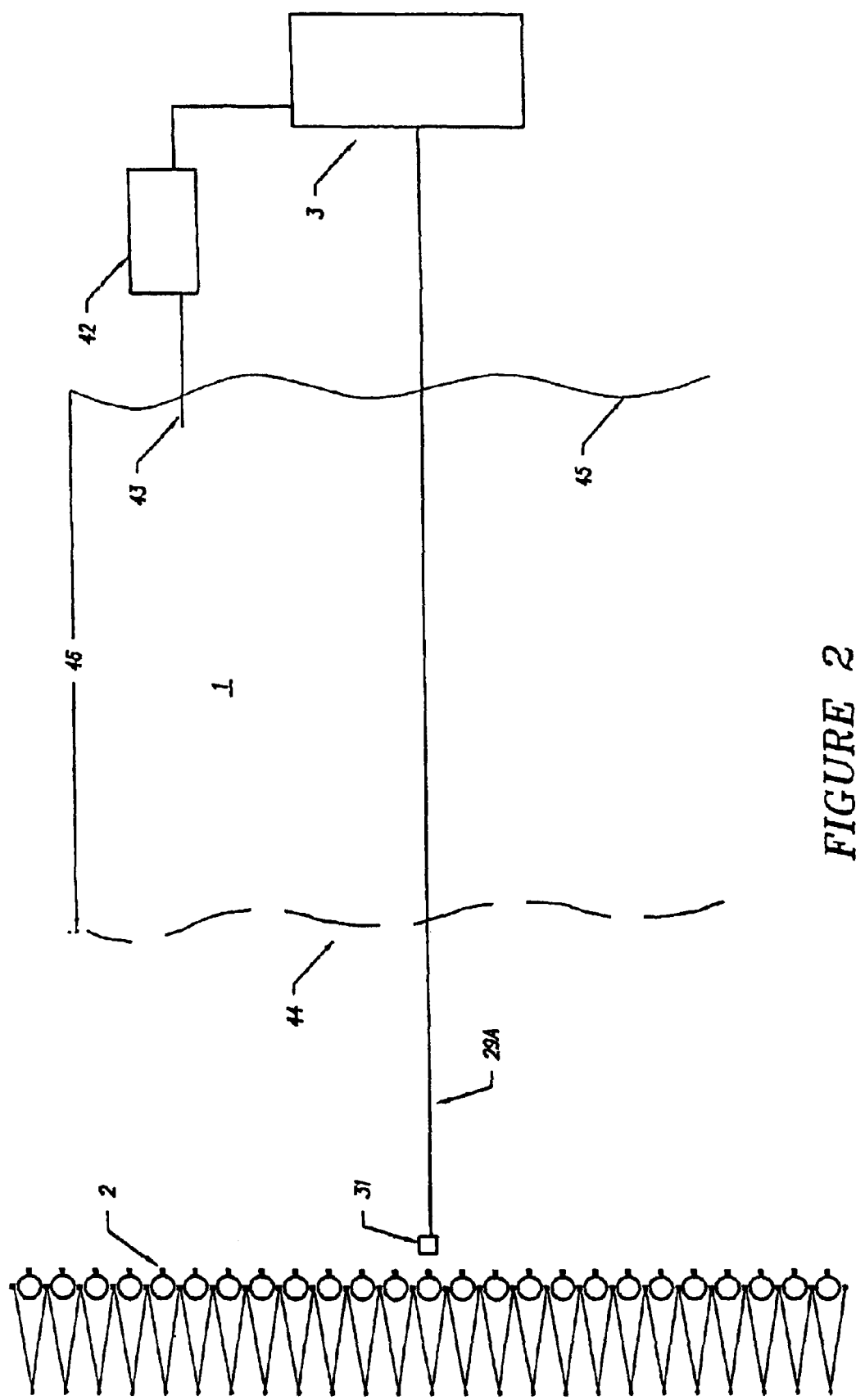
FIG. 2 is a schematic view of a power generating system having a plurality of floats, reservoir tanks, float frames, and etc.
Figure 3A:
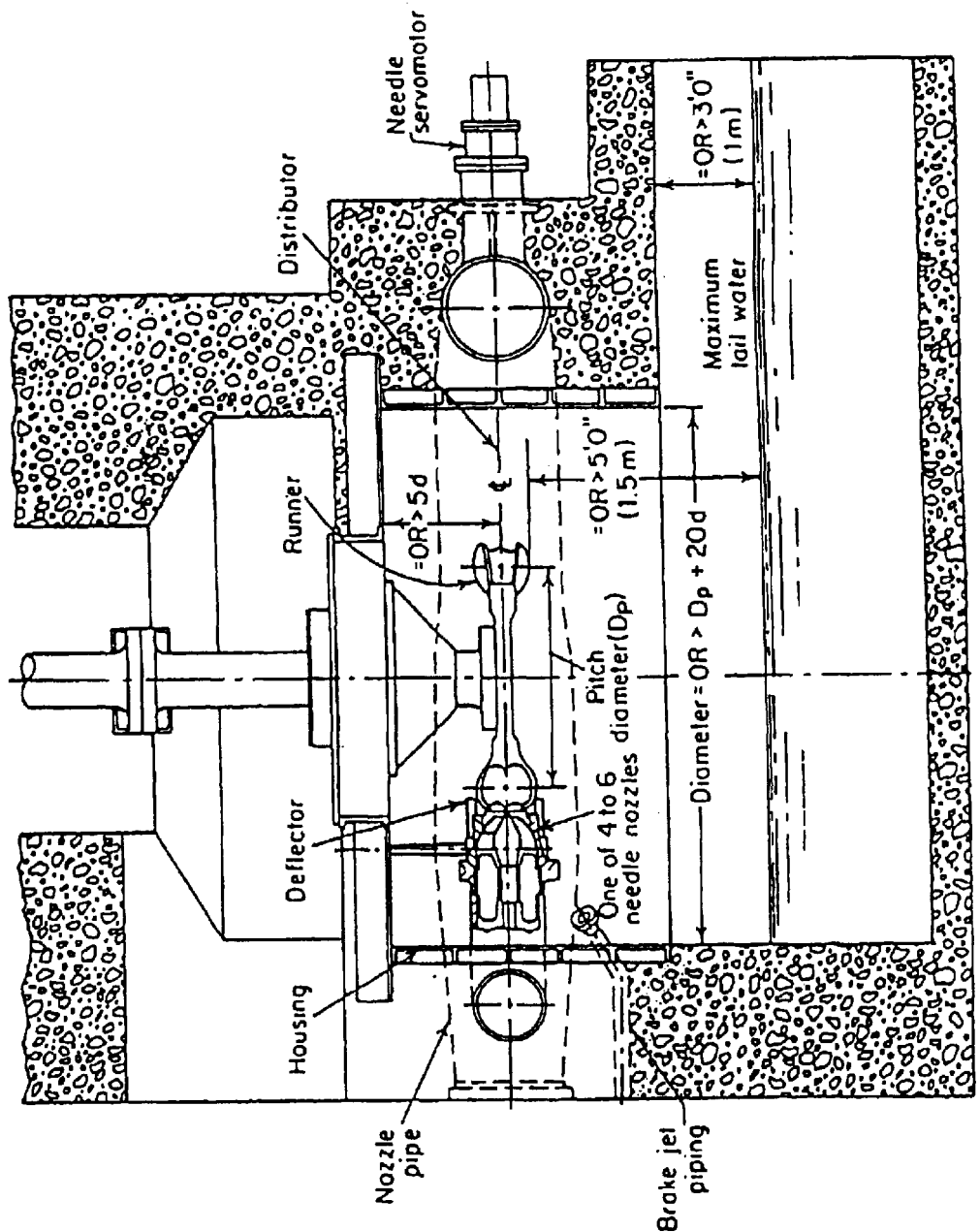
FIG. 3A is a cut away view of a turbine.
Figure 3B:
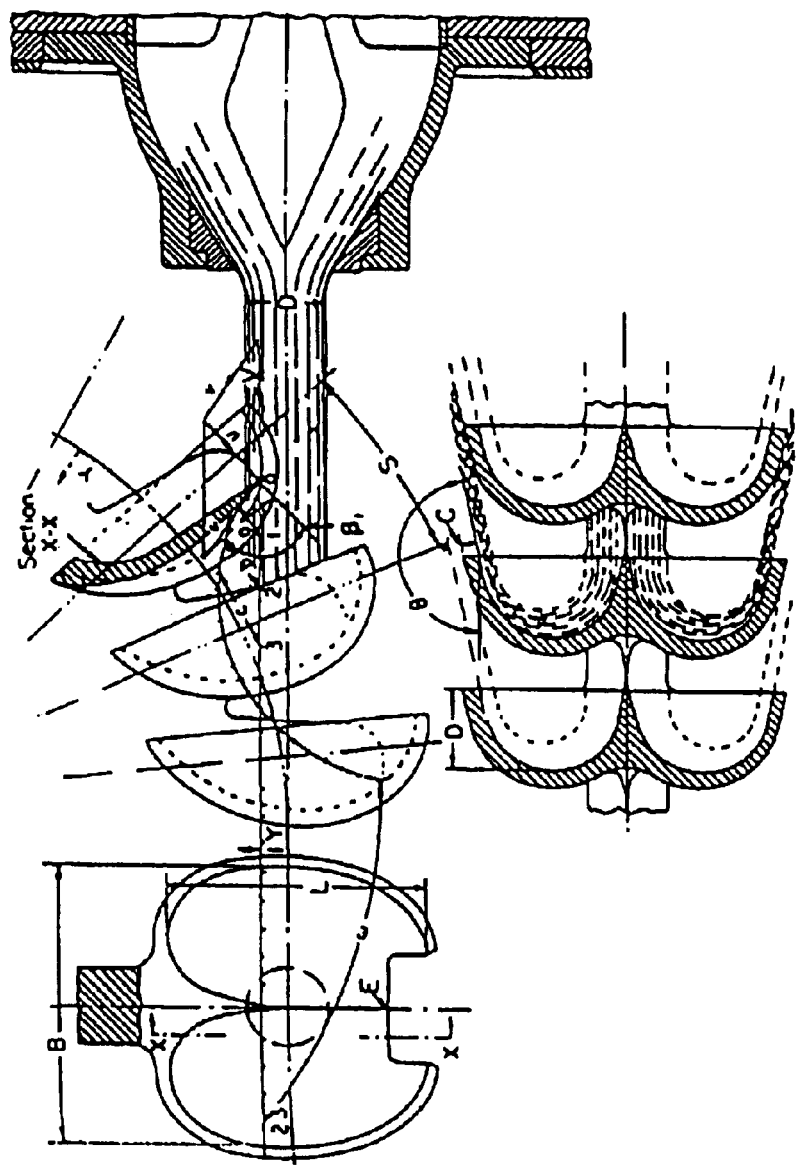
FIG. 3B is a cut-away view of turbine buckets.
Figure 4:
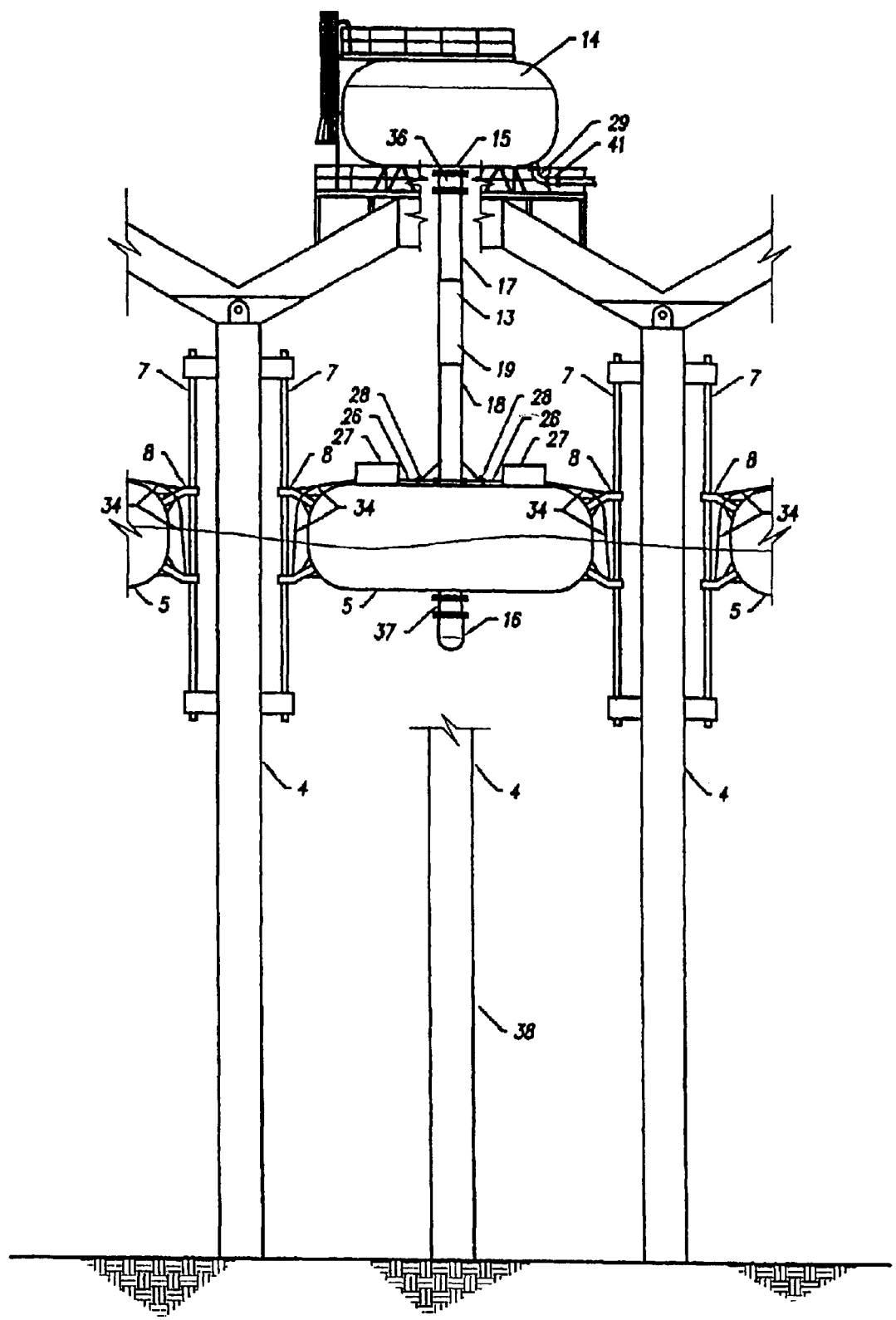
FIG. 4 is a cut-away side view of a float system.
Figure 5:
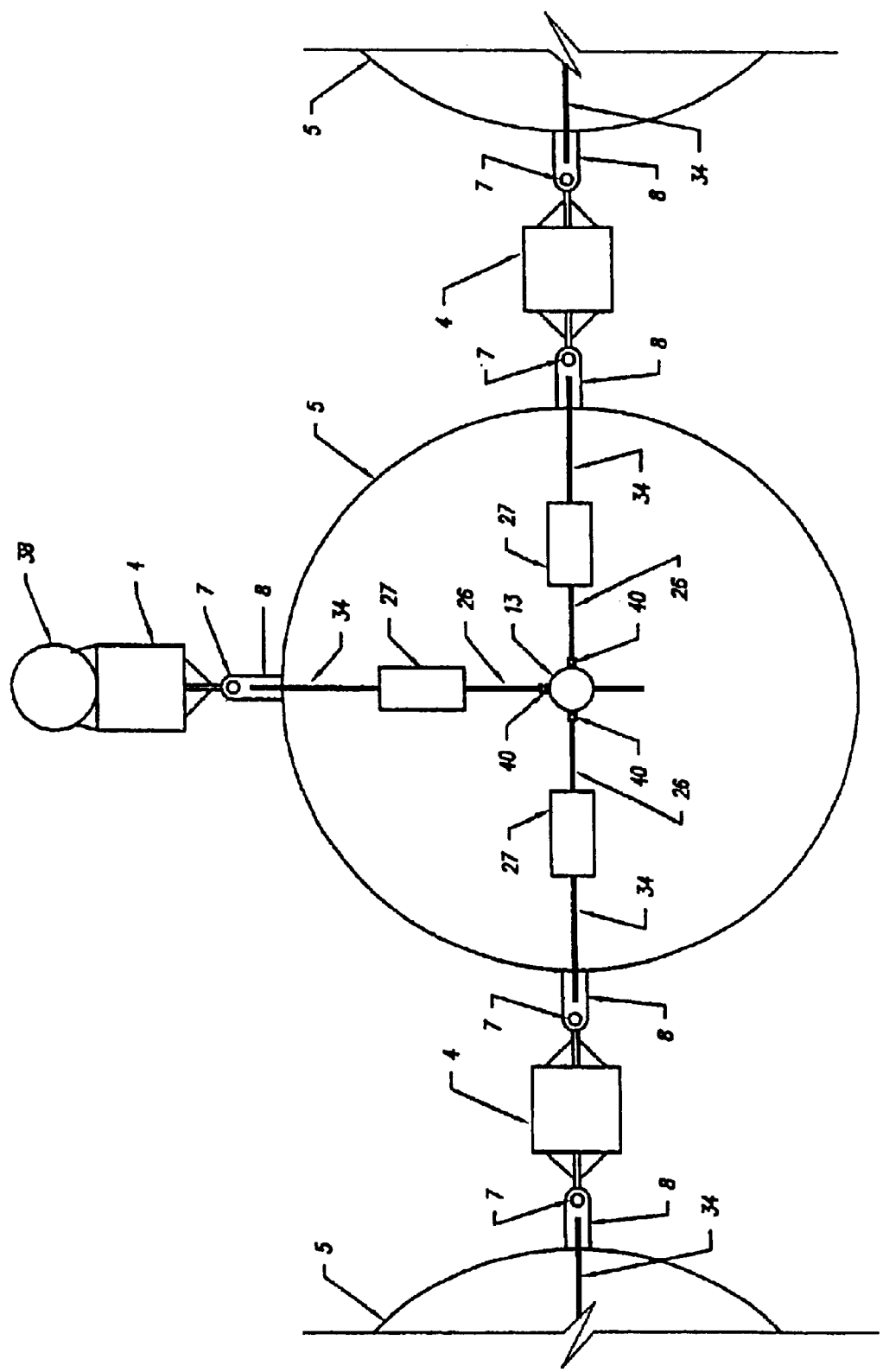
FIG. 5 is a schematic plan view of a float system looking down at the floats and cut away below the reservoir tanks.
Figure 8:
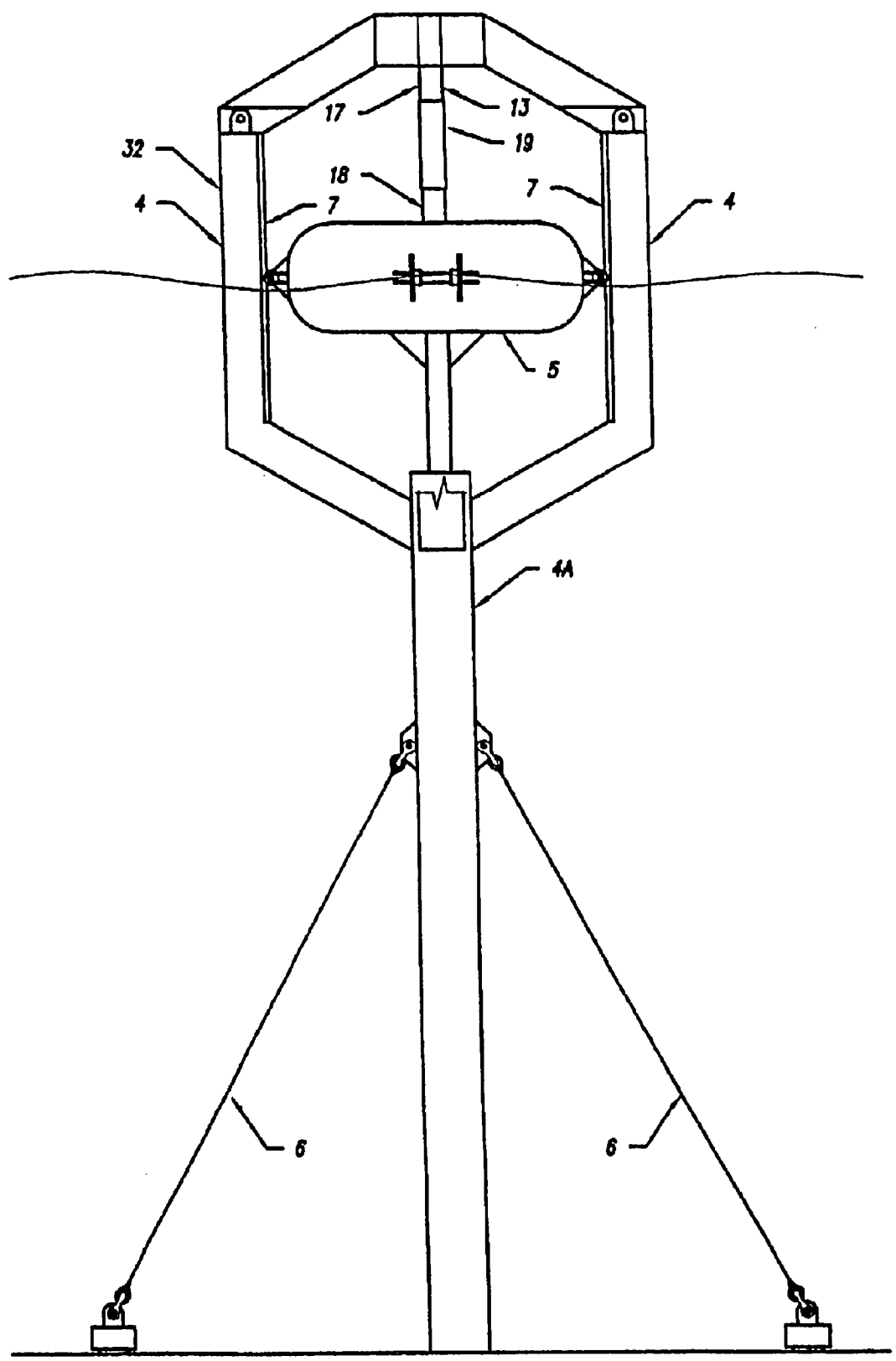
FIG. 8 is a side and partial cut-away view of a float, float frame, and support system.
Figure 10:
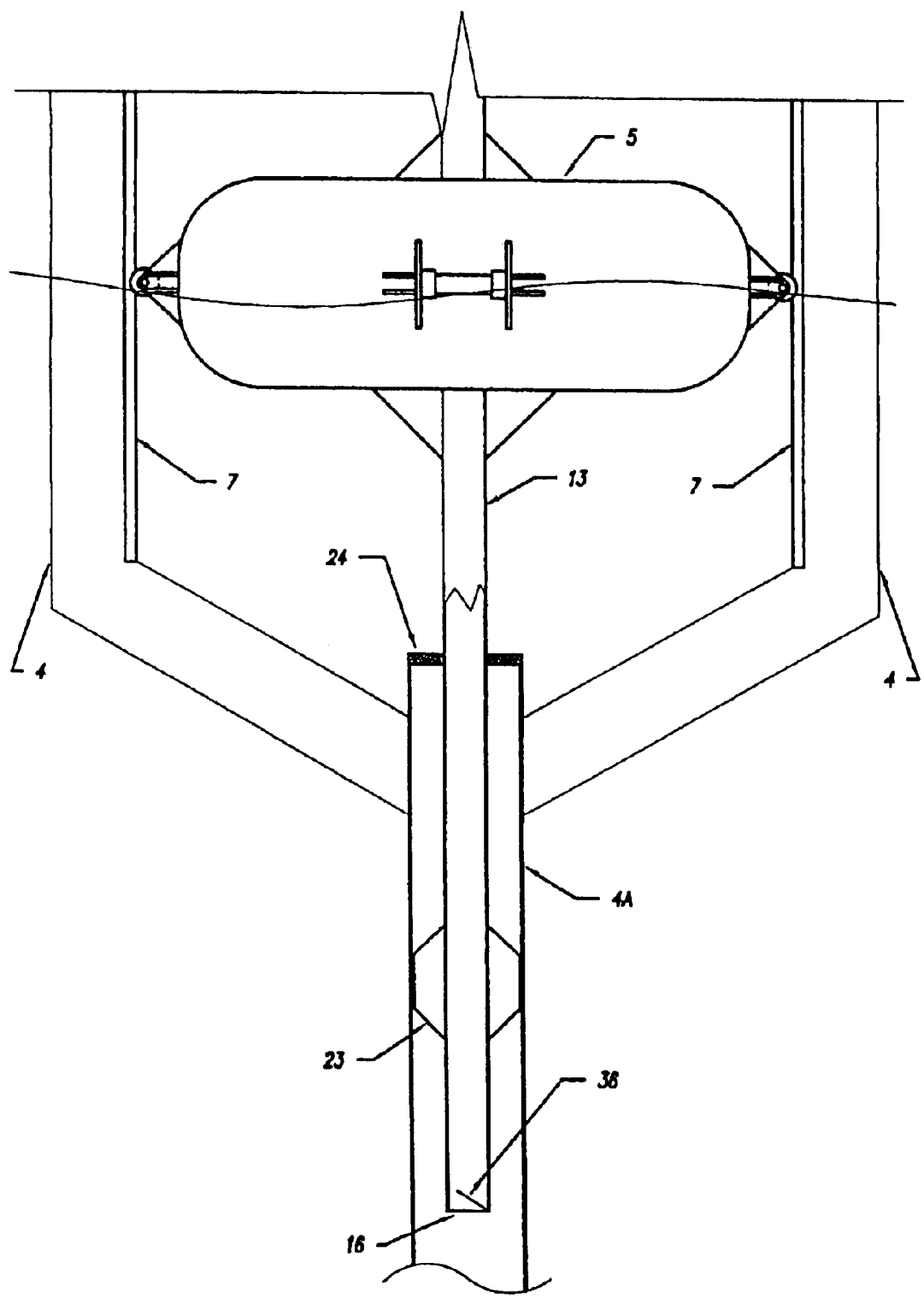
FIG. 10 is a side and partial cut-away view of a float, float frame, and support system, with the intake end of the pump line located inside one of the legs of the support system.
Figure 11:
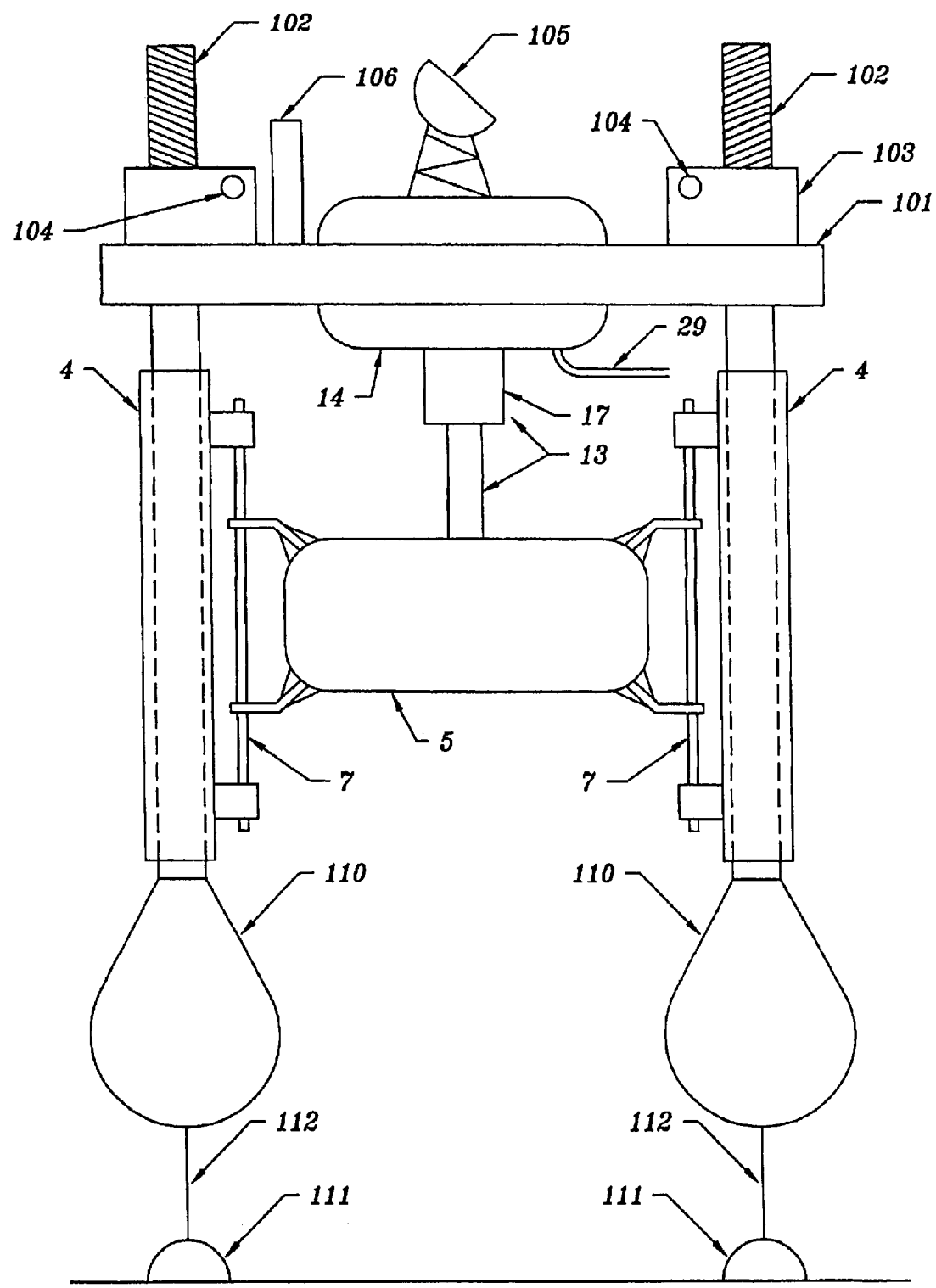
FIG. 11 is side view of one preferred embodiment of the invention having a buoy and cable support system and an adjustable platform.
Figure 12:
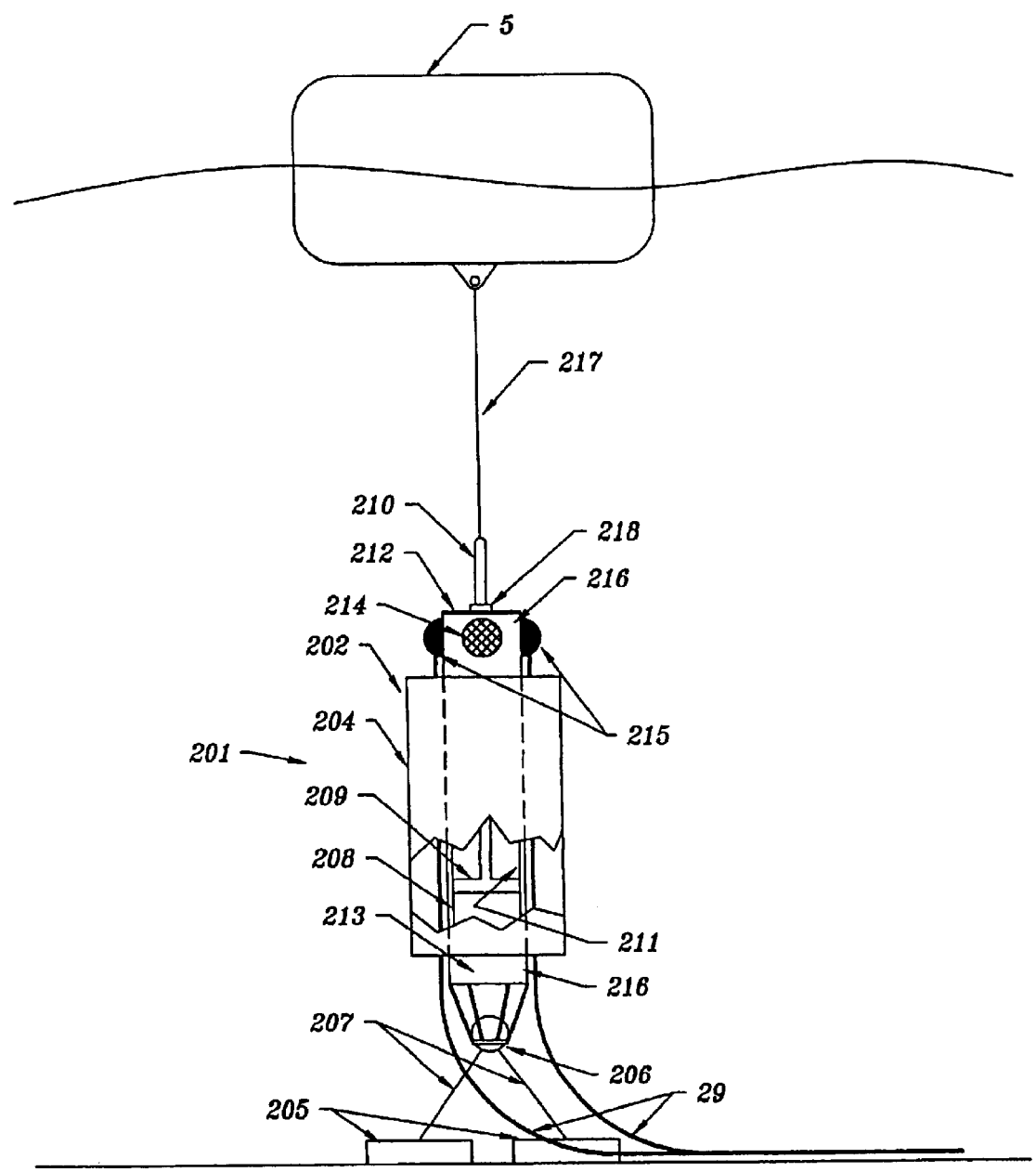
FIG. 12 is a side view of one preferred embodiment of the invention having submerged but buoyant piston housing containing a piston driven by a float.
Figures 13, 14A, 14B:
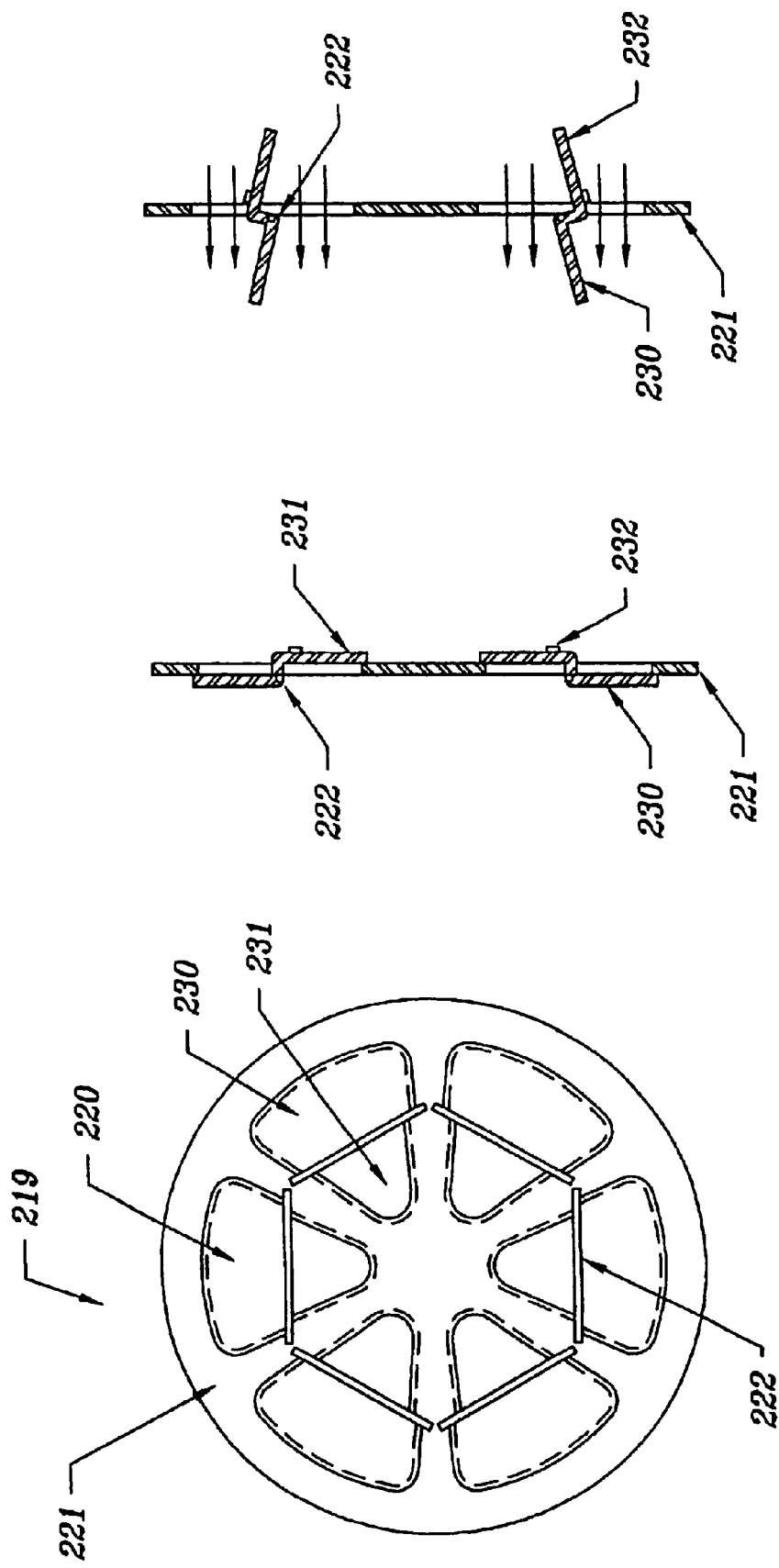
FIG. 13 is a side view of a preferred embodiment of a one way valve.
FIG. 14A is a cut away view of the one way valve shown in FIG. 13 with the vanes closed.
FIG. 14B is a cut away view of the one way valve shown in FIG. 13 with the vanes open.

The invention is a swell powered generator system 1. It is designed to convert the energy of swells in the open ocean, defined for purposes of this invention as that body of water outside the breaker line, into electricity. The system 1 is comprised of two principal components, a float system 2 and a generator system 3.

Float system 2 is comprised of float frame 32, preferably comprising a plurality of float guide legs 4, most preferably three ft. by three ft. box beams. In the preferred embodiment, there are three such legs 4 per float 5. In one embodiment, each leg 4 extends vertically from the ocean floor, thereby comprising a support structure 33. However, in another embodiment, legs 4 merge into a single leg 4A below float 5. In this embodiment, only single leg 4A will extend to the ocean floor. Single leg 4A will be anchored to the ocean floor with a plurality of cables 6, preferably four per leg. Legs 4 and 4A as well as the rest of float system 2 should preferably be made of materials suitable to withstand the rigors of the open ocean. Engineering techniques and materials used in the construction of offshore petroleum platforms are expected to be applicable to the construction of float system 2.

A guide rod 7, preferably a ten inch diameter steel pipe, extends from each leg 4. Guide rod 7 is substantially parallel to each leg 4 from which it extends, and is preferably at least about twenty-five feet long. A plurality of guide arms 8 will extend from float 5 to guide rods 7, preferably two guide arms 8 per guide rods 7. Each guide arm 8 will contain a guide rod channel 9 that will substantially encircle guide rod 7. The interior walls 10 of rod channels 9 will preferably be lined with magnets 11A aligned so that their north poles face guide rod 7. Guide rod 7 will likewise be lined with magnets 11B with their south poles facing out. Magnets 11A and 11B will preferably be positioned directly opposite one another and about 90° apart on each of their respective bodies, guide rods 7 and guide rod channels 9. This will cause a magnetic repulsion between magnets 11 and guide rod 7, which will minimize the contact between guide rods 7 and guide rod channels 9, thereby reducing the friction between guide arms 8 and guide rods 7 as float 5 rises and falls.

Each guide rod channel 9 is also preferably provided with one or more nozzles 12 configured to spray water between guide rods 7 and guide rod channels 9 as float 5 rises and falls. This will lubricate guide rods 7 and guide rod channels 9, thereby reducing friction between the same. Pressurized water is preferably provided to nozzles 12 from pump line 13, discussed below. A tank line 26 runs from pump line 13 to a nozzle tank 27 positioned atop float 5. A check valve 40 is preferably provided in tank line 26, which only allows water to flow into tank line 26. Between check valve 40 and tank 27 is a one way air valve 28, which is positioned to only allow air to flow into tank line 26. A nozzle line 34 connects nozzle tank 27 and nozzle 12. The flow of water and air into nozzle tank 27 will provide the impetus for water to flow out nozzle lines 28 to nozzle 12. The addition of air pressure will help keep the flow of water to nozzle 12 steady on both the up and down strokes of float 5. In the preferred embodiment, there is a separate nozzle tank 27 for each guide rod 7; however, a single nozzle tank 27 could be used to supply all nozzles 12 for each float 5, if desired.

Float 5 is attached to a pump line 13, preferably a thirty-six inch diameter steel pipe. In the preferred embodiment, pump line 13 depends from a reservoir tank 14. Pump line 13 has an outflow end 15 which connects to reservoir tank 14 and an inflow end 16 positioned below the waterline. Outflow end 15 of pump line 13 should be configured to allow water and air to flow in only one direction, out of pump line 13 and into reservoir tank 14. This is preferably done by positioning a check valve 35 in pump line 13 at outflow end 15. Similarly, inflow end 16 of pump line 13 should be configured to allow water and air to flow in only one direction, into pump line 13. Again, this is done by positioning a check valve 37 at inflow end 16 of pump line 13. Inflow end 16 is also preferably capped with a pup joint with a plurality of ½ inch holes drilled in it about one inch apart. The holes should preferably be screened to keep solid material out of pump line 13.

In another embodiment, inflow end 16 of pump line 13 is positioned within single leg 4A. Pump line 13 will rise and fall within single leg 4A. Stabilizers 23 are provided on pump line 13 to keep pump line 13 centered within single leg 4A. At the upper end of single leg 4A, a filter ring 24 will be provided to prevent solids from entering single leg 4A. In this embodiment, inflow end 16 is preferably provided with a flap 36 which is configured to open when float 5 falls and close when float 5 rises.

Float 5 is configured to decrease the volume of pump line 13 as float 5 rises and increase the volume of pump line 13 as float 5 falls. As the volume of pump line 13 increases, a vacuum will be created in pump line 13. Check valve 35 located at outflow end 15 will prevent water or air from being drawn into pump line 13 to fill the vacuum. The resultant vacuum will cause water to be pulled into pump line 13 through inflow end 16. When the volume of pump line 13 decreases, water in pump line 13 will be forced out. The check valve located at inflow end 16 will prevent the water from escaping there. The only outlet for the water in pump line 13 will be through outflow end 15 into reservoir tank 14. It should be noted that although in the embodiment described, water is pumped into reservoir tank 14, water or any other fluid could be pumped into any receptacle with the present invention.

Float 5 is configured to vary the volume of pump line 13 by varying its length while keeping its diameter substantially constant. This is accomplished by breaking pump line 13 into three sections, an upper section 17 which depends from reservoir tank 14, a lower section 18 which extends from float 5, and a sleeve 19 positioned around upper section 17 and lower section 18 and extending therebetween. Sleeve 19 should be configured to rise and fall along upper section 17 and lower section 18 should be configured to rise and fall within sleeve 19.

The connection between sleeve 19 and upper section 17 and the connection between sleeve 19 and lower section 18 should allow sleeve 19 and lower section 18 to move as described above and be airtight and water tight. Preferably this is accomplished by placing three ring type seals 39 between sleeve 19 and lower section 18 and another three ring type seals 39 between sleeve 19 and upper section 17. A greater or lesser number of seals 39 may be employed, as desired.

The desired connection could be achieved simply by having lower section 18 slide into or over upper section 17. However, the embodiment utilizing sleeve 19 is preferred because it will allow a greater range of motion. The motion of float 5 will need to be limited to prevent lower section 18 from striking upper section 17 and to prevent lower section 18 from becoming disconnected from upper section 17. There are two variables at work with these two objectives: the height of the swells and the mean sea level. The height of the swells will vary from day to day or hour to hour, and the sections should preferably be designed to allow them to move at least as much as the height of the largest expected swells. Although in the inventor's preferred embodiment, this distance is twenty-five feet, that distance may need to change depending upon the operating environment of float system 2 and the expected weather conditions there.

The mean sea level will change with the tide. On the West Coast of the United States, open ocean sea levels can often change as much as eight feet between high tide and low tide. At all times, upper section 17 remains at a fixed position. However, the mean distance between lower section 18 and upper section 17 can vary by as much as eight feet between high tide and low tide. Thus for example, if the mean distance between upper section 17 and lower section 18 is fifteen feet at low tide and twenty foot swells are occurring, float 5 will be able to rise and fall ten feet from the mean distance without lower section 18 striking upper section 17 if a two section pump line 13 is used. However, if those same twenty foot swells occur at high tide, the mean distance between lower section 18 and upper section 17 will only be seven feet, assuming an eight foot tidal range. At this distance of separation, lower section 18 will strike upper section 17 as it rises ten feet above the mean sea level on a twenty foot swell.

Sleeve 19 will move up and down with the water level, effectively allowing float 5 and lower section 18 to move through a wider range of motion at all tidal levels without lower section 18 either striking upper section 17 or separating from sleeve 19. To accomplish this goal, sleeve 19 is preferably suspended by one or more cables 20 which pass through a pulley system 21. Broadly, cables 20 attach to a counter weight 22 which equals the pull of sleeve 19, when counter weight 22 is buoyant. Counter weight 22 is positioned so that it is at water level. As the water level rises, the pull of counter weight 22 will decrease as more of counter weight 22 becomes submerged. This will cause sleeve 19 to fall and counter weight 22 to rise until equilibrium is restored. Conversely, when the water level falls, the pull of counter weight 22 will increase as less of counter weight 22 is submerged. This will cause sleeve 19 to rise and counter weight 22 to fall until equilibrium is restored. Thus, the mean height of sleeve 19 can be varied as the water level changes, thereby allowing the mean height of sleeve 19 to track the mean height of float 5 which also rises and falls with the water level.

In the preferred embodiment, at least two cables 20 extend from sleeve 19, one on each side of sleeve 19. This will help keep sleeve 19 from binding as it slides up and down. Pulleys 21A and 21B are preferably provided for each cable 20 extending from sleeve 19. Also in the preferred embodiment, counter weight 22 is divided into a dumb weight 22A, which is preferably concrete and suspended by one of cables 20 so that it will always be above the water level, and a buoyant weight 22B, which is suspended at the water level. Buoyant weight 22B is preferably contained within a thirty-six inch pipe which will act as a guide tube 38 for buoyant weight 22B. Dumb weight 22A should exceed the weight of sleeve 19, preferably by about fifty pounds. Buoyant weight 22B will counter dumb weight 22A, and is preferably configured to provide fifty pounds of pull when buoyant. As described above, the pull provided by buoyant weight 22B will decrease when it becomes more submerged and increase when it becomes less submerged. As the pull of buoyant weight 22B changes, dumb weight 22A, sleeve 19 and buoyant weight 22B will vary in position until equilibrium is restored. Although the inventor's preferred embodiment, counterweight 22 is divided into dumb weight 22A and buoyant weight 22B, it will be readily apparent that these tasks could be combined in a single buoyant counterweight 22.

It is desirable to minimize the variance of the water level in guide tube 38. As the water level in guide 38 changes, buoyant weight 22B, dumb weight 22A, and sleeve 19 will rise and fall, as described above. These components will wear less quickly if they do not rise and fall substantially with each passing swell. The ingress and egress of water to and from guide 38 is regulated to this end.

Guide tube 38 is open to the atmosphere at one or more locations substantially above the water level. Guide tube 38 is also open to the water at a point substantially below the water level. If the lower opening of guide tube 38 were unregulated, the water level in guide tube 38 would rise and fall with each passing swell. However, the lower opening is restricted. This is preferably accomplished by providing guide tube 38 with a sealed bottom and a water line 50 that extends about twelve feet below the bottom of guide tube 38 and which provides the only passage between guide tube 38 and the water. Water line 50 is shown straight in the figures, but it may be coiled or provided in other configurations or lengths. The purpose of water line 50 is to provide resistance to water flow, so it should be relatively thin. Water line 50 works in conjunction with valved aperture 51, described below, although either may be used independently, if sized properly.

The end of water line 50 that is open to the water is preferably provided with a valved aperture 51 of variable size and a larger screened opening surrounding valved aperture 51 to prevent valved aperture 51 and/or water line 50 from becoming clogged. By restricting the size of valved aperture 51, the rate at which water enters and leaves guide tube 38 can be controlled. Thus, when a swell raises the surface water level temporarily, only a small amount of water will enter guide tube 38 before the swell passes. Similarly, when a trough lowers the surface water level temporarily, only a small amount of water will run out of guide tube 38 before the trough passes. However, with longer lasting changes in the water level, such as a rise or fall associated with the tide, there will be sufficient time to allow enough water to enter or exit guide tube 38 to significantly affect the water level in guide tube 38. By properly sizing valved aperture 51, one should be able to allow the water level in guide tube 38 to move up and down with the tidal changes in water level, yet keep the water level in guide tube 38 at the mean water level of the surface between swells, where mean water level is defined as the level halfway between the average height of the swells and the average bottom of the troughs. Obviously, the proper size of valved aperture 51 will depend upon the height and length of the swells, the size of guide tube 38, and the length and diameter of water line 50. Ideally, valved aperture 51 should be sized to prevent the water level in guide 38 from varying more than about six inches and preferably to prevent the water level from varying more than about one inch in swells that are about five seconds apart. Valved aperture 51 should also preferably be adjustable to allow its size to be varied.

As an alternative to sleeve 19, the inventor contemplates an adjustable platform 101. In this embodiment, threaded members 102 extend from legs 4. At least one gear house 103 having a motor 104 and preferably containing a jack screw is mounted on platform 101. The gear house 103 will engage threaded member 102 such that when motor 104 is rotated, gear house 103 and platform 101 will rise or fall along threaded member 102.

In this embodiment, tank 14 is mounted on platform 101. Thus, tank 14 and upper section 17 of pump line 13 will rise and fall with platform 101. Platform 101 can be raised and lowered to maintain a uniform distance between tank 14 and the mean position of float 5 as the sea level rises and falls with the tide. This will allow the available range of motion of float 5 and lower section 18 of pump line 13 relative to upper section 17 to remain the same at high tide and at low tide without using compensating devices such as sleeve 19.

Advance precision tidal information is available via satellite. Where adjustable platform 101 is used, platform 101 may be provided with a satellite receiver or antennae 105. Antennae 105 will be in communication with a microprocessor 106. Microprocessor 106 will process the signal received from antennae 105 and will cause motor 104 and the gears in gear house 103 to turn in the appropriate direction to raise or lower platform 101 to maintain a constant height of platform 101 above the water.

As noted above, the water in pump line 13 will empty into reservoir tank 14. An outflow line 29 extends from reservoir tank 14 to generator system 3. Where adjustable platform 101 is used, outflow line 29, or at least the portions of outflow line 29 closest to reservoir tank 14, should preferably be flexible. Reservoir tank 14 is preferably provided with a one hundred eighty pounds per square inch air cushion. The air cushion will help keep the flow of water through outflow line 29 steady despite the fact that water will only enter reservoir tank on the upstroke of float 5.

A compressor may be provided to maintain the pressure in the air cushion; however, outflow line 29 is positioned at the bottom of reservoir tank 14 to prevent any of the air from escaping from reservoir tank 14. The inflow of water into reservoir tank 14 from pump line 13 should roughly equal the outflow of water through outflow line 29. However, if the outflow exceeds the inflow, pressure may drop and the compressor will have to be used to regain the desired pressure. Should the inflow into reservoir 14 exceed the outflow, the pressure will obviously rise. Excess pressure may be regulated by providing outflow line with a relief valve 41 set to open at about one hundred eighty-two pounds per square inch. If the pressure in reservoir 14 exceeds this pressure, relief valve 41 will open and excess water will escape through outflow line 29 until the pressure falls back to the desired level. Relief valve 41 may also be a check valve to preclude water from flowing back into reservoir tank 14 from outflow line 29.

As noted above, water will flow through outflow line 29 to generator system 3. Generator system 3 will consist essentially of an impulse turbine 30 which will spin as water from outflow line 29 passes over turbine 30. As turbine 30 rotates, it will turn a generator which will induce an electric current, in the same general fashion as dam based hydroelectric generators operate. After the water has passed over the turbine, it should preferably be collected in a holding tank 42 to cool, as the pumping and turbine process will usually raise the temperature of the water several degrees. Once the water has cooled, it may be returned to the ocean. It is desirable to allow the water to cool to prevent the discharge 43 from creating an artificially warm area in the ocean at the point of discharge. Such elevated temperatures can cause undesirable ecological changes, which may be avoided by allowing the water to cool.

Generator system 3 may be located proximate to float system 2; however, in the preferred embodiment, float system 2 is located past the breaker line 44 outside of the surf zone 46 while generator system 3 located on the shore 45. Thus, outflow line 29 will extend from float system 2 to generator system 3, typically either along the sea bed or buried beneath the same. When buried, outflow line 29 will preferably be about sixteen feet below the surface of the sea bed. Placing generator system 3 on shore will allow the generator components to be sheltered from the elements of the open ocean. It will also allow electricity to be transported without running electrical lines over water.

It may be desirable to use float system 2 in deep water. In such instances, it may be difficult, physically or economically, for one or all of legs 4 to extend all the way to the ocean floor. In such instances, it may be desirable to support legs 4 on one or more buoys 110. One or more anchors 111 may then be attached to sea floor and one or more cables 112 will extend from anchors 111 to buoys 110 or to legs 4. Buoys 110 should preferably have sufficient buoyancy to support float system 2 at a level higher than cables 112 will allow float system 2 to reach. This will keep float system 2 at a fixed level that will not rise or fall significantly with the passing swells, which of course is significant if float 5 is to rise and fall with the swells relative to the rest of float system 2. Anchors 111 may be provided with one or more winches which can be used to shorten or lengthen cables 112 if it becomes necessary to raise of lower float system 2 substantially.

In another embodiment of the invention, water intake may occur further from the surface of the water body. In this embodiment, a piston housing 201 is provided. Piston housing 201 should preferably have a surface end 202 facing the surface of the water body and a bottom end 203 facing the bottom of the water body.

Piston housing 201 is preferably positively buoyant. This may be accomplished by fitting piston housing 201 with a jacket 204 made of buoyant material such as a high volume low density foam or a bladder or tank containing compressed gas or other conventional buoyant materials. Alternatively, piston housing 201 may be constructed of buoyant materials such that no jacket is required.

One or more anchors 205 are preferably placed in the bed of the water body. Piston housing 201 is secured to the bed of the water body by attaching piston housing 201 to anchors 205. Piston housing 201 is preferably provided with a ball joint 206 at bottom end 203 of piston housing 201. One or more anchor lines 207 and preferably four anchor lines 207, which may be cables, chain, rope, or other conventional fastening material, preferably connect anchors 205 to piston housing 201 via ball joint 206. This connection will keep buoyant piston housing 201 floating above anchors 201 but will allow piston housing 201 to swivel on ball joint 206 relative to anchors 205 if piston housing 201 is pulled laterally. Most preferably, anchor lines 207 will be of sufficient length to suspend piston housing 201 so that its surface end 202 is about forty feet below the surface of the water body at low tide.

Piston housing 201 is further provided with a piston cylinder 208 and a piston 209. Piston cylinder 208 is preferably about thirty-six inches in diameter and is preferably about thirty feet in length. A piston rod 210 preferably extends upward from piston 209 toward surface end 202 of piston housing 201. Together, piston rod 210 and piston 209 should be quite heavy—on the order of three thousand pounds or more—in order to bias piston 209 to readily fall toward bottom end 203 of piston housing 201. In this embodiment, piston rod 210, piston 209, and piston cylinder 208 are preferably made of stainless steel or other sturdy corrosion resistant material.

Piston 209 should be configured to create a substantially water tight seal with the interior surfaces 211 of piston cylinder 208. This may be done with O-rings or other conventional sealing mechanisms.

Where piston cylinder 208 is comprised of a magnetic material, friction between piston 209 and piston cylinder 208 may be minimized by providing the outer rim of piston 209 with a plurality of magnets configured so that the magnets will be repelled by the surface of piston cylinder 208. Other conventional means for reducing friction such as polishing the adjoining surfaces and lubrication may be used as well.

Piston cylinder 208 has a first end 212 facing the surface of the water body and a second end 213 facing the bed of the water body. Second end 213 may be provided with a screen or filter, but is otherwise open to the water body whereby water may freely flow into and out of piston cylinder 208 via second end 213. However, piston 209 will prevent water entering piston cylinder 208 via second end 213 from flowing past piston 209.

First end 212 of piston cylinder 208 is provided with at least one and preferably two intake valves 214 and at least one and preferably two outflow valves 215. Intake valves 214 and outflow valves 215 are preferably uni-directional valves, each configured to allow flow in the opposite direction. Intake valves 214 are preferably provided with screens or filters to prevent debris from being drawn into piston cylinder 208. Other than intake valves 214 and outflow valves 215, first end 212 is substantially water tight. Piston rod 210 will preferably pass through first end 212 via a piston rod aperture 218 in first end 212. Piston rod aperture 218 should also preferably be configured to create a substantially water tight seal between piston rod aperture 218 and piston rod 210 when piston rod 210 is in place.

Motive force for piston 209 will preferably be provided by at least one float 5. Float 5 will be connected to piston 209 via piston rod 210 by a buoy line 217, which may be a cable, chain, rope, or other conventional connecting device. As float 5 rises with the swells on the surface of the water body, it will cause piston 209 to move toward first end 212. Similarly, as float 5 falls with the swells, it will allow piston 209 to fall away from first end 212 with gravity.

As the current pulls float 5 laterally relative to piston housing 201, piston housing 201 will preferably swivel on ball joint 206 to face float 5, which will facilitate the movement of piston 209 in response to the motion of float 5. By keeping the surface end 202 of piston housing 201 within about forty feet of the surface of the water body at low tide, the degree to which float 5 will cause piston housing to swivel on ball joint 206 may be minimized.

As piston 209 moves away from first end 212 of piston cylinder 208, piston 209 will draw water into inflow valves 214 and simultaneously close outflow valves 215. Similarly, when piston 209 moves toward first end 212 of piston cylinder, piston 209 will force the water in piston cylinder 208 out outflow valves 215 and simultaneously close inflow valves 214. Mechanical stops 216 are preferably provided to limit the motion of piston 209 in piston cylinder 208 and to prevent piston 209 from being extracted from or falling out of piston cylinder 208.

One or more outflow lines 29 will be positioned over and in fluid communication with outflow valves 215. As piston 209 forces water out outflow valves 215, the water will enter outflow lines 29 and be conveyed to generator system 3 on shore as described above or to such other locations and/or devices as desired. Outflow lines 29 from multiple piston housings 201 may used in tandem if desired.

The length of piston housing 201 and piston cylinder 208 should be selected to facilitate the use of this embodiment of the invention in water bodies with wide tidal fluctuations. As the height of the surface of the water body changes with the tide, the position of float 5 relative to surface end 202 of piston housing 201 will change as well. This will cause the mean position of piston 209 to vary within piston cylinder 208. In the preferred embodiment, piston housing 201, piston cylinder 208, and float 5 should be positioned so that the mean position of piston 209 is at approximately the midpoint of piston cylinder 208 when the water body is at the midpoint between average high tide and average low tide. Thus, in a eight foot tidal range for example, at high tide the mean position of piston 209 will be about four feet above the midpoint and at low tide the mean position of piston 209 will be about four feet below the midpoint. Piston 209 will oscillate about its respective mean positions as float 5 rises and falls with the passing swells. A piston housing 201 and piston cylinder 208 of about thirty feet in length are expected to be sufficient to allow the mean position of piston 209 to move with the changing tide and still be able to rise and fall with float 5 without striking mechanical stops 216 with every stroke. However, the length of piston housing 201 and piston cylinder 208 may be varied as needed according to local tidal conditions.

Although intake valves 214 and outflow valves 215 may use any conventional uni-directional valve, each preferably comprises a one way valve 219. One way valve 219 comprises one or more vanes 220 and a valve body 221. Vanes 220 are preferably oblong in shape and are mounted to valve body 221 on a hinge 222. Hinge 222 should be positioned on vane 222 such that the surface area of vane 220 on a first side 230 of hinge 222 is greater than the surface area of vane 220 on the other side of hinge 222, a second side 231. Preferably, hinge 222 is positioned so that about sixty percent of the surface area of vane 220 is on one side of hinge 222 and about forty percent of the surface area of vane 220 in on the other side of hinge 222. As fluid presses against vane 220, the difference in surface area will cause the pressure exerted on one side of vane 220 to exceed the pressure exerted on the other. This will cause vane 220 to turn on hinge 222 so that the portion of vane 220 with the greatest surface area moves in the direction of the flow of the fluid and the portion of vane 220 with the smaller surface area moves in the direction opposite to the flow of the fluid. Vanes 220 will open or close with the fluid flow depending upon the orientation of one way valve 219. This will allow one way valve 219 to be used for either intake valve 214 or outflow valve 215 simply by reversing the direction one way valve 219 faces.

By having part of vanes 220 move against the fluid flow, the fluid flow may be used to generate resistance to the force driving vane 220 open or closed. This resistance will slow the rate at which vane 220 is opened and closed, which in turn should reduce the wear and tear on all components of one way valve 219.

All components of one way valve 219 are preferably made of stainless steel or other strong corrosion resistant material. Each component of one way valve is also preferably coated with rubber, plastic or other similar material in order to facilitate seal formation and to further inhibit corrosion.

Each vane 220 of one way valve 219 is preferably provided with a stop 232 to prevent vane 220 from opening more than about eighty-five degrees with respect to valve body 221. If vane 220 should be allowed to swivel on hinge 222 until vane 220 is perpendicular to valve body 221, vane 220 would be perpendicular to the fluid flow which could inhibit the closing of vane 220 when the direction of the fluid flow changes.

Body 221 of one way valve 219 is preferably a round plate of about eighteen inches in diameter. There are preferably six to eight radially positioned vanes 220 mounted on body 221.

Float 5 will make an ideal platform for mounting sonar and/or radar surveillance units. The pumping action powered by float 5 could be used to drive a generator which could power these units. Alternatively, the surveillance units could be powered by solar panels and batteries and merely use float 5 as a convenient platform for observation.

Although the invention has been described in terms of a float system 2 comprising only a single float 5, pump line 13 and reservoir tank 14, as well as the other components described above, in the preferred embodiment, float system 2 will consist of a plurality of such floats 5, pump lines 13, reservoir tanks 14, and etc. Each reservoir tank will have an outflow line 29. In the preferred embodiment, outflow lines 29 will merge together into a single outflow line 29A extending to generator system 3. In one embodiment, the separate outflow lines will meet at a platform manifold 31, where they will merge into single outflow line 29A and continue on to the generator. Platform manifold 31 may be located on or offshore as desired. By building a float system 2 having sufficient number of floats 5, enough water may be pumped to either meet or augment the electricity needs of an industrial facility or a municipality.

I claim:

1. A swell powered tide compensated electric generator comprising:
   a support structure comprising at least one leg extending from the floor of a water body;
   a float frame supported by said support structure containing a float configured to rise and fall with the swells, said float frame configured to guide said float as it rises and falls;
   a pump line having an internal volume extending from said float to a tank; said pump line comprising a lower section configured to rise and fall with said float, said lower section having at least one intake aperture configured to open when said float is falling and further configured to close when said float is rising; said intake aperture positioned to be at or below the surface of said water body when said float is falling whereby said intake aperture will provide fluid passage into said pump line when said intake aperture is open;
   said pump line further comprising an upper section extending from said tank, said upper section containing at least one outflow aperture configured to open when said float is rising and to close when said float is falling, said outflow aperture providing fluid passage between said pump line and said tank when said outflow aperture is open;
   said pump line further comprising a sleeve slidably disposed between said upper section and said lower section, said sleeve configured to create a substantially airtight and watertight seal between said sleeve and said lower section and between said sleeve and said upper section, said sleeve further configured to rise and fall with said tide;
   said pump line further configured to decrease in internal volume when said float rises and to increase in internal volume when said float falls, whereby water may be drawn into said pump line as said float falls and expelled from said pump line into said tank as said float rises; and
   an outflow line extending from said tank to a turbine, whereby water pumped into said tank may be used to drive said turbine.

2. A swell powered tide compensated electric generator according to claim 1 wherein said float frame further comprises a plurality of generally vertical guide rods.

3. A swell powered tide compensated electric generator according to claim 2 wherein said float is attached to said guide rods by a plurality of guide arms, each guide rod having a guide rod channel positioned to substantially encircle at least one of said guide rods, whereby said float may rise and fall with said swells along a path generally parallel to said guide rods.

4. A swell powered tide compensated electric generator according to claim 3 wherein said guide arms and said guide rods are configured to reduce the friction between said guide arms and said guide rods as said float rises and falls.

5. A swell powered tide compensated electric generator according to claim 4 wherein said guide rod channels and said guide rods are each provided with a plurality of oppositely aligned magnets positioned so that said oppositely aligned magnets face each other, whereby said magnets will minimize the contact between said guide rod channels and said guide rods.

6. A swell powered tide compensated electric generator according to claim 5 further comprising a plurality of nozzles positioned to spray water along said guide rods, whereby the surface between said guide rods channels and said guide rods may be lubricated.

7. A swell powered tide compensated electric generator according to claim 6 further comprising a nozzle tank configured to provide pressurized water to at least one of said nozzles.

8. A swell powered tide compensated electric generator according to claim 7 further comprising a tank line extending from said pump line to said nozzle tank, said tank line configured to only allow water to flow from said pump line to said nozzle tank, whereby water may be diverted from said pump line to said nozzle tank.

9. A swell powered tide compensated electric generator according to claim 8 wherein said tank line further comprises an air valve configured to only allow air to flow into said tank line from the atmosphere, whereby air may be drawn into tank line by the force created as water is pumped past said air valve, pressurizing said nozzle tank.

10. A swell powered tide compensated electric generator according to claim 4 further comprising a plurality of nozzles positioned to spray water along said guide rods, whereby the surface between said guide rods channels and said guide rods may be lubricated.

11. A swell powered tide compensated electric generator according to claim 10 further comprising a nozzle tank configured to provide pressurized water to at least one of said nozzles.

12. A swell powered tide compensated electric generator according to claim 11 further comprising a tank line extending from said pump line to said nozzle tank, said tank line configured to only allow water to flow from said pump line to nozzle tank, whereby water may be diverted from said pump line to said nozzle tank.

13. A swell powered tide compensated electric generator according to claim 12 wherein said tank line further comprises an air valve configured to only allow air to flow into said tank line from the atmosphere, whereby air may be drawn into tank line by the force created as water is pumped past said air valve, pressurizing said nozzle tank.

14. A swell powered tide compensated electric generator according to claim 1 wherein said sleeve is suspended by at least one cable.

15. A swell powered tide compensated electric generator according to claim 14 wherein said cable connects said sleeve to a first counter weight, said cable passing over a pulley between said first counter weight and said sleeve, whereby the gravitational pull on said sleeve will oppose the gravitational pull on said first counter weight.

16. A swell powered tide compensated electric generator according to claim 15 wherein said first counter weight is at least partially buoyant, said sleeve having a weight sufficient to balance the pull of said first counter weight when said first counter weight is at least partially submerged, said sleeve having a weight that is insufficient to balance the pull of said first counter weight when said first counter weight is not at least partially submerged.

17. A swell powered tide compensated electric generator according to claim 16 wherein said first counter weight is positioned within a substantially hollow guide tube, said guide tube having a first end positioned above the surface of said water body and a second end positioned below the surface of said water body, wherein said first end of said tube is in fluid communication with the atmosphere whereby ambient pressure may be maintained within said guide tube and wherein said second end of said guide tube is in fluid communication with said body of water, whereby said guide tube will contain water having a water level, and wherein said fluid communication between said guide tube and said water body is provided via an aperture sized to prevent the water level in said guide tube from changing more than about six inches in about five seconds.

18. A swell powered tide compensated electric generator according to claim 17 wherein said aperture is sized to prevent the water level in said guide tube from changing more than about one inch in about five seconds.

19. A swell powered tide compensated electric generator according to claim 17 wherein said aperture is provided with an adjustable valve whereby the size of said aperture may be varied.

20. A swell powered tide compensated electric generator according to claim 15 further comprising a second counterweight, said second counterweight connected to said first counter weight by a cable passing over a pulley so that the gravitational pull on said second counterweight opposes the gravitational pull on said first counter weight, said second counter weight being at least partially buoyant such that the gravitational force exerted by said second counter weight on said first counter weight will diminish as said second counter weight is submerged.

21. A swell powered tide compensated electric generator according to claim 20 wherein said first counter weight has a weight sufficient to balance the pull of said sleeve and said second counter weight when said second counter weight is at least partially submerged and wherein said first counter weight has a weight that is insufficient to balance the pull of said sleeve and said second counter weight when said second counter weight is not at least partially submerged.

22. A swell powered tide compensated electric generator according to claim 21 wherein said second counter weight is positioned within a substantially hollow guide tube, said guide tube having a first end positioned above the surface of said water body and a second end positioned below the surface of said water body, wherein said first end of said tube is in fluid communication with the atmosphere whereby ambient pressure may be maintained within said guide tube and wherein said second end of said guide tube is in fluid communication with said body of water, whereby said guide tube will contain water having a water level, and wherein said fluid communication between said guide tube and said water body is provided via an aperture sized to prevent the water level in said guide tube from changing more than about six inches in about five seconds.

23. A swell powered tide compensated electric generator according to claim 22 wherein said aperture is sized to prevent the water level in said guide tube from changing more than about one inch in about five seconds.

24. A swell powered tide compensated electric generator according to claim 22 wherein said aperture is provided with an adjustable valve whereby the size of said aperture may be varied.

25. A swell powered tide compensated electric generator according to claim 1 wherein said turbine is located on land.

26. A swell powered tide compensated electric generator comprising:

a support structure comprising at least one leg extending from the floor of a water body;

a float frame supported by said support structure containing a float configured to rise and fall with the swells, said float frame configured to guide said float as it rises and falls;

a pump line having an internal volume extending from said float to a tank; said pump line comprising a lower section configured to rise and fall with said float, said lower section having at least one intake aperture positioned to be at or below the surface of said water body when said float is falling, said intake aperture configured to only allow fluid to flow through said intake aperture from said water body into said pump line;

said pump line further comprising an upper section extending from said tank, said upper section containing at least one outflow aperture, said outflow aperture configured to only allow fluid to flow through said outflow aperture from said pump line into said tank;

said pump line further comprising a sleeve slidably disposed between said upper section and said lower section, said sleeve configured to create a substantially airtight and watertight seal between said sleeve and said lower section and between said sleeve and said upper section, said sleeve further configured to rise and fall with said tide;

said pump line further configured to decrease in internal volume when said float rises and to increase in internal volume when said float falls, whereby water may be drawn into said pump line as said float falls and expelled from said pump line into said tank as said float rises; and an outflow line extending from said tank to a turbine, whereby water pumped into said tank may be used to drive said turbine.

27. A swell powered tide compensated pump:

a support structure comprising at least one leg extending from the floor of a water body;

a float frame supported by said support structure containing a float configured to rise and fall with the swells, said float frame configured to guide said float as it rises and falls; and a pump line having an internal volume extending from said float to a receptacle configured to receive fluid; said pump line comprising a lower section configured to rise and fall with said float, said lower section having at least one intake aperture positioned to be at or below the surface of said fluid when said float is falling, said intake aperture configured to only allow fluid to flow through said intake aperture from said fluid into said pump line;

said pump line further comprising an upper section extending from said receptacle, said upper section containing at least one outflow aperture, said outflow aperture configured to only allow fluid to flow through said outflow aperture from said pump line into said receptacle;

said pump line further comprising a sleeve slidably disposed between said upper section and said lower section, said sleeve configured to create a substantially airtight and fluid tight seal between said sleeve and said lower section and between said sleeve and said upper section, said sleeve further configured to rise and fall with said tide; and said pump line further configured to decrease in internal volume when said float rises and to increase in internal volume when said float falls, whereby fluid may be drawn into said pump line as said float falls and expelled from said pump line into said receptacle as said float rises.

28. An electric generator comprising

A) a plurality of swell powered tide compensated pumps, said pumps comprising
  1) a support structure having at least one leg extending from the floor of a water body;
  2) a float frame supported by said support structure containing a float configured to rise and fall with the swells, said float frame configured to guide said float as it rises and falls;
  3) a pump line having an internal volume extending from said float to a tank; said pump line comprising a lower section configured to rise and fall with said float, said lower section having at least one intake aperture positioned to be at or below the surface of said water body when said float is falling, said intake aperture configured to only allow fluid to flow through said intake aperture from said water body into said pump line; said pump line further comprising an upper section extending from said tank, said upper section containing at least one outflow aperture, said outflow aperture configured to only allow fluid to flow through said outflow aperture from said pump line into said tank; said pump line further comprising a sleeve slidably disposed between said upper section and said lower section, said sleeve configured to create a substantially airtight and watertight seal between said sleeve and said lower section and between said sleeve and said upper section, said sleeve further configured to rise and fall with said tide; said pump line further configured to decrease in internal volume when said float rises and to increase in internal volume when said float falls, whereby water may be drawn into said pump line as said float falls and expelled from said pump line into said tank as said float rises; and B) at least one outflow line extending from said tank to a turbine, whereby water pumped into said tank may be used to drive said generator.

29. A swell powered tide compensated electric generator comprising:

a support structure comprising at least one leg configured to support a platform above a water body;

a float frame depending from said support structure and containing a float configured to rise and fall with the swells, said float frame configured to guide said float as it rises and falls;

a pump line having an internal volume extending from said float to a tank positioned on said platform; said pump line comprising a lower section configured to rise and fall with said float, said lower section having at least one intake aperture configured to open when said float is falling and further configured to close when said float is rising; said intake aperture positioned to be at or below the surface of said water body when said float is falling whereby said intake aperture will provide fluid passage into said pump line when said intake aperture is open;

said pump line further comprising an upper section extending from said tank, said upper section containing at least one outflow aperture configured to open when said float is rising and to close when said float is falling, said outflow aperture providing fluid passage between said pump line and said tank when said outflow aperture is open;

said pump line further configured to decrease in internal volume when said float rises and to increase in internal volume when said float falls, whereby water may be drawn into said pump line as said float falls and expelled from said pump line into said tank as said float rises; and an outflow line extending from said tank to a turbine, whereby water pumped into said tank may be used to drive said turbine.

30. A swell powered tide compensated electric generator according to claim 29 wherein said leg contains a threaded member extending substantially vertically therefrom in a direction away from said water body.

31. A swell powered tide compensated electric generator according to claim 30 further comprising a gear house positioned on said platform, said gear house containing a plurality of gears, wherein said gears are configured to operatively engage said threaded member, whereby rotation of said gears will raise and lower said platform.

32. A swell powered tide compensated electric generator according to claim 31 further comprising a motor, said motor configured to rotate said gears in said gear house.

33. A swell powered tide compensated electric generator according to claim 32 further comprising an antennae configured to receive broadcast signals containing short term sea level variation predictions.

34. A swell powered tide compensated electric generator according to claim 33 further comprising a microprocessor operatively connected to said antennae and said motor, wherein said microprocessor is configured to receive and process said signals from said antennae and to output appropriate instructions to said motor to cause said motor to turn said gears in said gear house, whereby said platform may be raised or lowered to maintain the distance between said platform and said water body.

35. A swell powered tide compensated electric generator according to claim 29 further comprising at least one buoy attached to said support structure.

36. A swell powered tide compensated electric generator according to claim 35 further comprising an anchor attached to the floor of said water body and a cable extending from said support structure to said anchor.

37. A swell powered tide compensated electric generator according to claim 36 wherein said buoy is configured to provide sufficient buoyancy to render said cable substantially taught.

* * * * *